United States Patent [19]

Wederski

[11] Patent Number: 4,568,287
[45] Date of Patent: Feb. 4, 1986

[54] LIGHT CHARGED CELESTIAL SIMULATION DEVICE

[76] Inventor: DuWayne A. Wederski, 8120 SW. 34th Ave., Portland, Oreg. 97219

[21] Appl. No.: 639,235

[22] Filed: Aug. 9, 1984

[51] Int. Cl.⁴ ............................................. G09B 27/00
[52] U.S. Cl. ........................................ 434/285; 40/430
[58] Field of Search ........................ 434/285, 286, 148; 40/429, 430, 431, 432, 470, 473, 617, 582

[56] References Cited

U.S. PATENT DOCUMENTS

| | | | |
|---|---|---|---|
| 29,292 | 7/1860 | Monteith | 434/148 |
| 3,251,143 | 5/1966 | Eisenhauer | 434/285 |
| 3,473,428 | 10/1969 | Phillips | 84/464 |
| 3,711,697 | 1/1973 | Boyle | 240/10 |
| 4,207,696 | 6/1980 | Hyman et al. | 40/473 |
| 4,250,537 | 2/1981 | Roegner | 362/86 |
| 4,307,528 | 12/1981 | Dewees et al. | 40/582 X |
| 4,345,395 | 8/1982 | Grassi | 40/441 |

FOREIGN PATENT DOCUMENTS 1090312 10/1954 France ................................ 434/148

OTHER PUBLICATIONS

Reference Guide Sheet from OMSI, Portland, Oregon, Copyright 1978, L. Deckman, published by Hansen Planetarium, Salt Lake City, Utah.

Primary Examiner—William H. Grieb
Attorney, Agent, or Firm—Eugene M. Eckelman

[57] ABSTRACT

A body portion of non-luminous material has an enlarged surface area on which design elements are applied of luminous material. The design elements are shaped to depict celestial bodies and the arrangement is such that when these design portions are charged by light, they will glow in the dark so that in an overhead position a nocturnal celestial appearance is provided. The body portion can consist of a double layer of material and the design elements confined between the two layers. A support for the body portion may include an electric motor for rotating the body portion to simulate rotation of the earth.

5 Claims, 6 Drawing Figures

U.S. Patent  Feb. 4, 1986  4,568,287
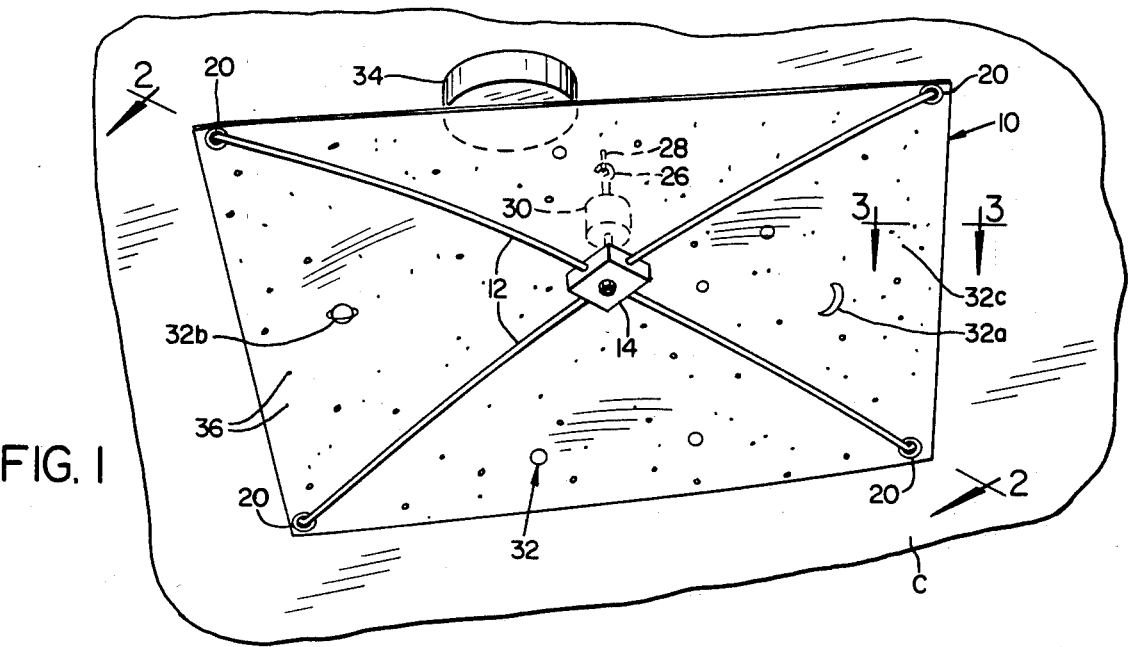
FIG. 1
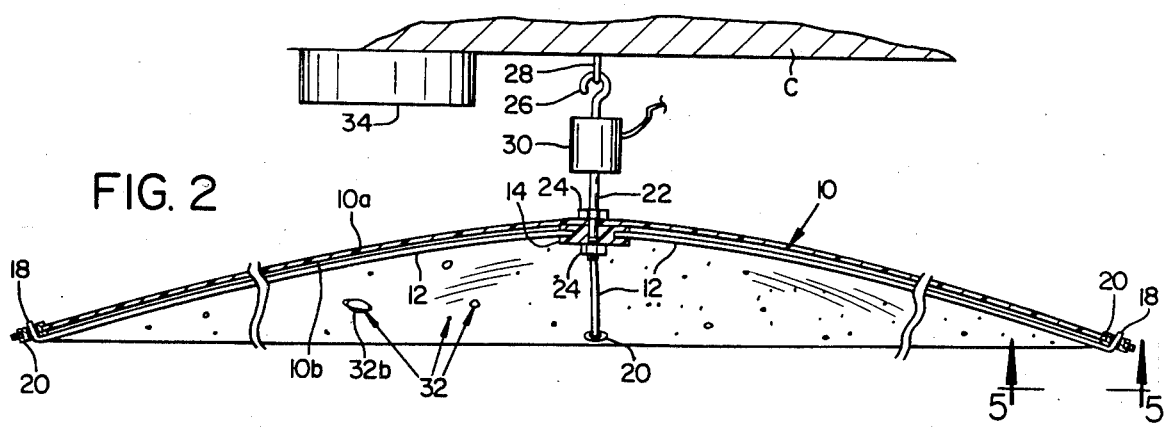
FIG. 2
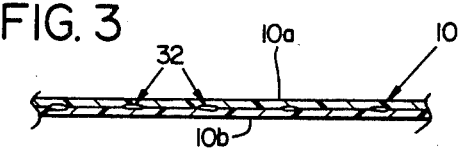
FIG. 3
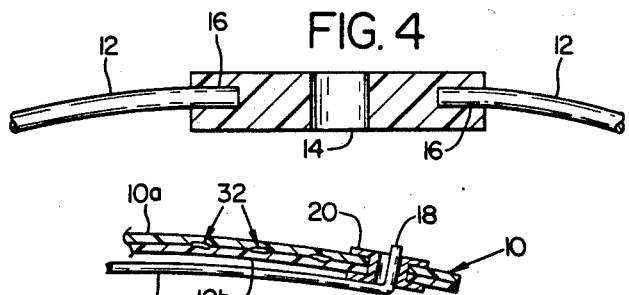
FIG. 4 / FIG. 6
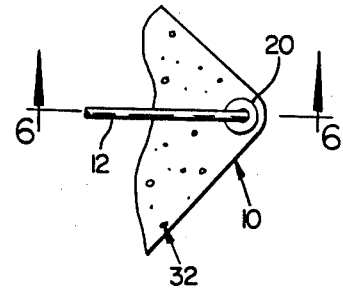
FIG. 5

LIGHT CHARGED CELESTIAL SIMULATION DEVICE

STATEMENT OF THE INVENTION

This invention relates to a new and useful display device and more particularly is concerned with a light charged device simulating a nocturnal celestial effect.

SUMMARY OF THE INVENTION

According to the present invention and forming a primary objective thereof, a display device is provided which is arranged to be suspended from an overhead surface, such as a ceiling, and when charged with light a simulated nocturnal celestial effect is provided.

Another object is to provide a display device of the type described which is arranged to be associated with an electric motor capable of rotating the device in a simulated rotation of the earth.

In carrying out the objectives of the invention, a body portion of non-luminous material is provided having an enlarged surface to which is applied luminous material in the design of celestial bodies. A nocturnal celestial effect is accomplished by enclosing the device in a dark room in an overhead position. In a preferred construction, the body portion comprises a pair of layered upper and lower transparent sheets between which the luminous material is confined. The body portion includes a central hub and supporting radial spokes and is arranged to be associated with an electric motor which provides a simulation of the rotation of the earth.

The invention will be better understood and additional objectives will become apparent from the following description taken in connection with the accompanying drawings.

BRIEF DESCRIPTION OF THE DRAWINGS

FIG. 1 is a perspective view of the present display device in an overhead position;

FIG. 2 is an enlarged sectional view taken on the line 2—2 of FIG. 1;

FIG. 3 is an enlarged fragmentary sectional view taken on the line 3—3 of FIG. 1;

FIG. 4 is a central enlarged fragmentary view taken similar to FIG. 2 showing central supporting hub and spoke structure;

FIG. 5 is a fragmentary bottom plan view taken on the line 5—5 of FIG. 2; and

FIG. 6 is a fragmentary sectional view taken on the line 6—6 of FIG. 5.

DETAILED DESCRIPTION OF A PREFERRED EMBODIMENT

With particular reference to the drawings, the numeral 10 designates a body portion of the invention having an enlarged surface area. This body portion is supported in a domed condition by curved spokes or ribs 12 leading from the corners to a central hub member 14. With particular reference to FIG. 4, the spokes simply may have a press fit in apertures 16 in the hub for ease of assembly and disassembly. The outer ends of the spokes have an upwardly turned portion 18, as detailed in FIG. 6, and these upwardly turned ends removably engage grommets 20 secured in the body portion 10. The removable engagement of the spokes 12 in the hub 14 and in the body portion 10 provide a knock down structure for packaging and also a structure that is easily assembled for use. This assembly has a central support rod 22 having suitable detachable connection to the hub 14, as by a threaded nut connection 24.

Rod 22 provides support means arranged to suspend the assembly from a ceiling c or the like, and for this purpose the upper end of the rod has a hook 26 arranged for engagement in screw eye 28 mounted in the ceiling.

Rod 22 may comprise the output shaft of an electric motor 30 integrated with the hook 26 for support on the ceiling. The motor is arranged to rotate the body portion for a reason which will become more apparent hereinafter.

The purpose of the present display device is to simulate a nocturnal celestial view, and to accomplish this purpose, the body portion 10 is constructed of a non-luminous material and design elements 32 are applied thereto which depict celestial bodies. For example, such celestial bodies may comprise the moon 32a, planets 32b, galaxies 32c and the like, such pattern of celestial bodies comprising substantially an exact duplication of size and location of the heavens or of course artificially composed patterns. The elements 32 of the design can be applied to the undersurface of the body portion 10, or, if the body portion is transparent, such design elements can be applied to the upper surface. In a preferred construction, however, and as best seen in FIGS. 3 and 6, the body portion 10 comprises a pair of transparent plastic sheets 10a and 10b in superimposed relation and the design elements 32 are confined therebetween. Such an arrangement provides a protection of the design elements and in addition serves to hold them in a fixed position. If desired, such design elements may comprise luminous paint painted on one of the facing surfaces of the two layers.

In the use of the present device, it is preferably hung from a ceiling for viewing overhead in the dark. The design elements are charged by shining a light thereon whereupon the luminous material of which the design elements are made will be charged for glowing in the dark for a short time. The display device simulates a nocturnal celestial appearance. The luminous material may be charged by a flashlight or if desired the device can be hung by and charged from a room light 34.

Additional design elements 36 of non-luminous but reflective material, such as glitter material, can be secured between the two layers 10a and 10b. Such light reflective material or elements is used for reflecting light for daytime use or for use in the dark by light shining on the device.

The motor 30 can be energized to rotate the device for simulating the view which exists from the rotation of the earth. The motor may have suitable gear reduction to provide the desired slow speed of rotation.

The invention is readily knocked down to a small compact package, namely, the spokes 12 are removable from the hub 14 as well as from the grommets 20 and the body portion 10 folded.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A celestial simulation device comprising
   a sheet-like body portion of non-luminous material, means on said body portion arranged to suspend it overhead in a dark area, said body portion having a peripheral defining edge and also having an exposed lower surface for viewing thereof from distant positions therebelow, and design elements applied to said surface depicting celestial bodies, said design elements being formed of a luminous material whereby to glow in the dark after being charged by light and to simulate a nocturnal celestial appearance.

2. The celestial simulation device of claim 1 wherein said body portion comprises a transparent plastic and said design elements comprise luminous paint.

3. The celestial simulation device of claim 1 wherein said body portion comprises a pair of layered upper and lower sheets with at least the lower one of said sheets being transparent, said design elements being confined between said layers.

4. The celestial simulation device of claim 1 wherein said body portion comprises a pair of upper and lower sheets of transparent plastic with adjacent face surfaces and said design elements comprise luminous paint applied to one of said facing surfaces.

5. The celestial simulation device of claim 1 wherein said means to suspend the said body portion comprises a central hub and radiating spokes secured at their outer ends to said body portion, said spokes holding said body portion in a slighlty concave shape as viewed from beneath to simulate celestial curvature.

* * * * *